United States Patent [19]
Tsuji et al.

[11] Patent Number: 5,568,268
[45] Date of Patent: Oct. 22, 1996

[54] IMAGE FORMING DEVICE WITH FORGERY PREVENTION

[75] Inventors: Masato Tsuji; Katsuyuki Kouno; Hidefumi Nishigai; Hideyasu Nakamura; Nobuyuki Kodera, all of Kanagawa, Japan

[73] Assignee: Fuji Xerox Co., Ltd., Tokyo, Japan

[21] Appl. No.: 424,669

[22] Filed: Apr. 19, 1995

[30] Foreign Application Priority Data

Jun. 15, 1994 [JP] Japan .................................. 6-156796

[51] Int. Cl.$^6$ .......................... G03C 21/00; H04N 1/00; H04N 1/40
[52] U.S. Cl. .................. 358/296; 358/404; 358/406; 358/444; 355/201
[58] Field of Search ................................ 358/296, 400, 358/401, 404, 406, 434, 448, 444; 355/202, 204, 209, 201; 400/76, 692

[56] References Cited

U.S. PATENT DOCUMENTS

| | | | |
|---|---|---|---|
| 5,212,519 | 5/1993 | Kasahara et al. | 355/200 |
| 5,444,518 | 8/1995 | Hashiguchi et al. | 355/201 |
| 5,465,161 | 11/1995 | Funada et al. | 358/438 |

FOREIGN PATENT DOCUMENTS

| | | |
|---|---|---|
| 0551016A1 | 7/1993 | European Pat. Off. . |
| 0554115A1 | 8/1993 | European Pat. Off. . |
| 2083571 | 3/1990 | Japan . |
| 4-294682 | 10/1992 | Japan . |
| 4-332260 | 11/1992 | Japan . |

*Primary Examiner*—Peter S. Wong
*Assistant Examiner*—Gregory J. Toatley, Jr.
*Attorney, Agent, or Firm*—Finnegan, Henderson, Farabow, Garrett & Dunner, L.L.P.

[57] ABSTRACT

An image forming device, such as a color copying machine or a color printer, which processes an input image signal, thereby obtains an output image signal, and forms an output image on the basis of the output image signal. In the image forming device, an information input unit writes some information identifying the copying machine to an area in an information storing unit at the time when a power source is turned on for the copying machine for the first time after the assembly thereof. When the power source is turned on for a second and any subsequent times for the copying machine, the copying machine copies an original sheet in such a state of the machine that the information stored in the area of the information storing unit is added to the output image in the form of a pursuit image which it is hard or impossible to recognize with the human eyes.

4 Claims, 10 Drawing Sheets

IMAGE FORMING DEVICE WITH FORGERY PREVENTION

BACKGROUND OF THE INVENTION

1. Field of the Invention

The present invention relates to an image forming device, such as a color copying machine or a color printer, which processes an input image signal, thereby obtains an output image signal, and forms an output image on the basis of the output image signal.

2. Description of the Related Art

The remarkable improvement recently made on the picture quality of a color copying machine has given rise to a concern about forgeries of such specified documents as bank notes and securities.

In view of this situation, Japanese Patent Unexamined Publication No. Hei. 4-294682 proposes a process for writing in advance such information as an identification number unique to a given copying machine or a manufacturing number of the copying machine to a read only memory (ROM) built in the copying machine, for reading such information specifying the copying machine out of the ROM at the time of a copying operation, and for adding the specifying information in the form of a specific pattern which it is difficult for the human eyes to discern to the output images, so that it is made possible to identify the copying machine used for making a particular copy with reference to any copied object.

Further, Japanese Patent Unexamined Publication No. Hei. 4-332260 proposes a process for writing information in the form of a unique pattern in advance to a ROM built in a copying machine, for reading such a unique pattern of information out of the ROM at the time of a copying operation, and for synthesizing the unique identifying pattern in a color tone or density not readily discernible by the human eyes for its addition to the output images, so that it is indicated in the output images that the images are not any original but a copy.

Further, Japanese Patent Unexamined Publication No. Hei. 4-332260 cited above also proposes a method developed in consideration of a case in which a person who intending to falsify any particular document cuts off the electrical connection of the ROM or the pattern adding circuit mentioned above, removes the ROM or the pattern adding circuit, or replaces the ROM with a memory not containing any pattern information written to it. The proposed method prohibits any copying operation in case the system of the copying machine has recognized any disconnection or removal of the memory or the pattern adding circuit or any falsification of any pattern information by performing a check on the electrical connection of the ROM or the pattern adding circuit mentioned above in advance of a copying operation and thereby determining whether or not the memory or the pattern adding circuit is present in the copying machine and whether or not the information read out of the memory satisfy the prescribed conditions.

SUMMARY OF THE INVENTION

However, the conventional copying machine described above is constructed in such a manner that information specifying the copying machine is written in advance to a ROM built into a copying machine, such a copying machine presents the disadvantage in that it requires the control of information for specifying each such copying machine, which will be complicated and troublesome, in the manufacture of such a copying machine because it is necessary to determine the specific contents of the information for specifying a given copying machine, such as a unique identification number of the copying machine or a unique manufacturing number of each particular unit of copying machine at a relatively early stage in the manufacturing process prior to the assembling process in the manufacture of such copying machines and to write the information to a ROM to be built into the copying machine and it is necessary also to assemble each such copying machine with such a ROM built into it on the basis of an accurate recognition of the particular contents of the information written to the ROM for each single unit of copying machine.

Therefore, the present invention offers an image forming device, such as a color copying machine or a color printer, which processes input image signals, thereby obtains output image signals, and forms output images from the output image signals and additionally forms an output image in the form of a pursuit image specifically identifying the image forming device and is yet difficult or not possible to discern with the human eyes, and this image forming device is designed and constructed in such a manner that it can accept an input of specific information for identifying the image forming device after it is assembled but does not require any control of information specifying the image forming device in the manufacturing process for the image forming device.

The present invention offers an image forming device which processes an input image signal, thereby obtains an output image signal, and forms an output image from the output image signal, the image forming device including: information generating means for generating information for identifying the image forming device; information storing means for storing the information; and pursuit image signal adding means for adding to the output image signal the information stored in the information storing means as a pursuit image signal which it is difficult or impossible to recognize with the human eyes.

Further, the present invention provides an image forming device which processes an input image signal, thereby obtains an output image signal, and forms an output image from the output image signal, the image forming device including: information generating means for generating information for identifying the image forming device; information storing means for storing the information; memory control means for controlling the storage of information by the information storing means in such a manner that the information storing means does not store any new information after the information storing means has once stored the information generated by the information generating means; information comparing means for comparing the information generated by the information generating means with the information stored in the information storing means; and pursuit image signal adding means for adding to the output image signal the information stored in the information storing means as a pursuit image signal which it is difficult or impossible to recognize with the human eyes only when the information comparing means finds that the information generated by the information generating means is in agreement with the information stored in the information storing means.

DETAILED DESCRIPTION OF THE PREFERRED EMBODIMENTS

A specific example of an application of the present invention to a color copying machine will be described with reference to FIGS. 1 to 11.

Figure 1:
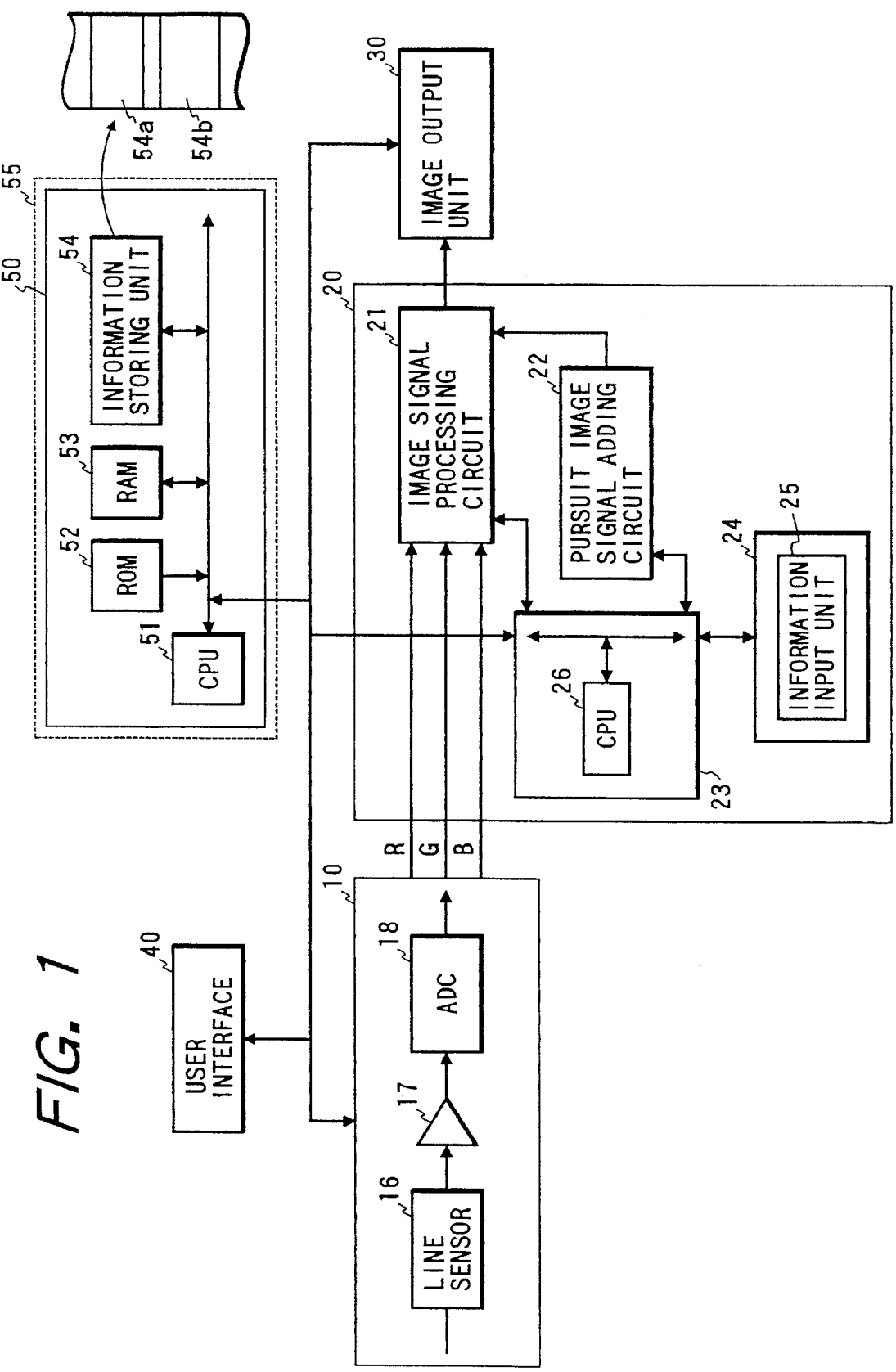
FIG. 1 is a block diagram illustrating an example of the functional configuration of a color copying machine according to the present invention.
Figure 11:
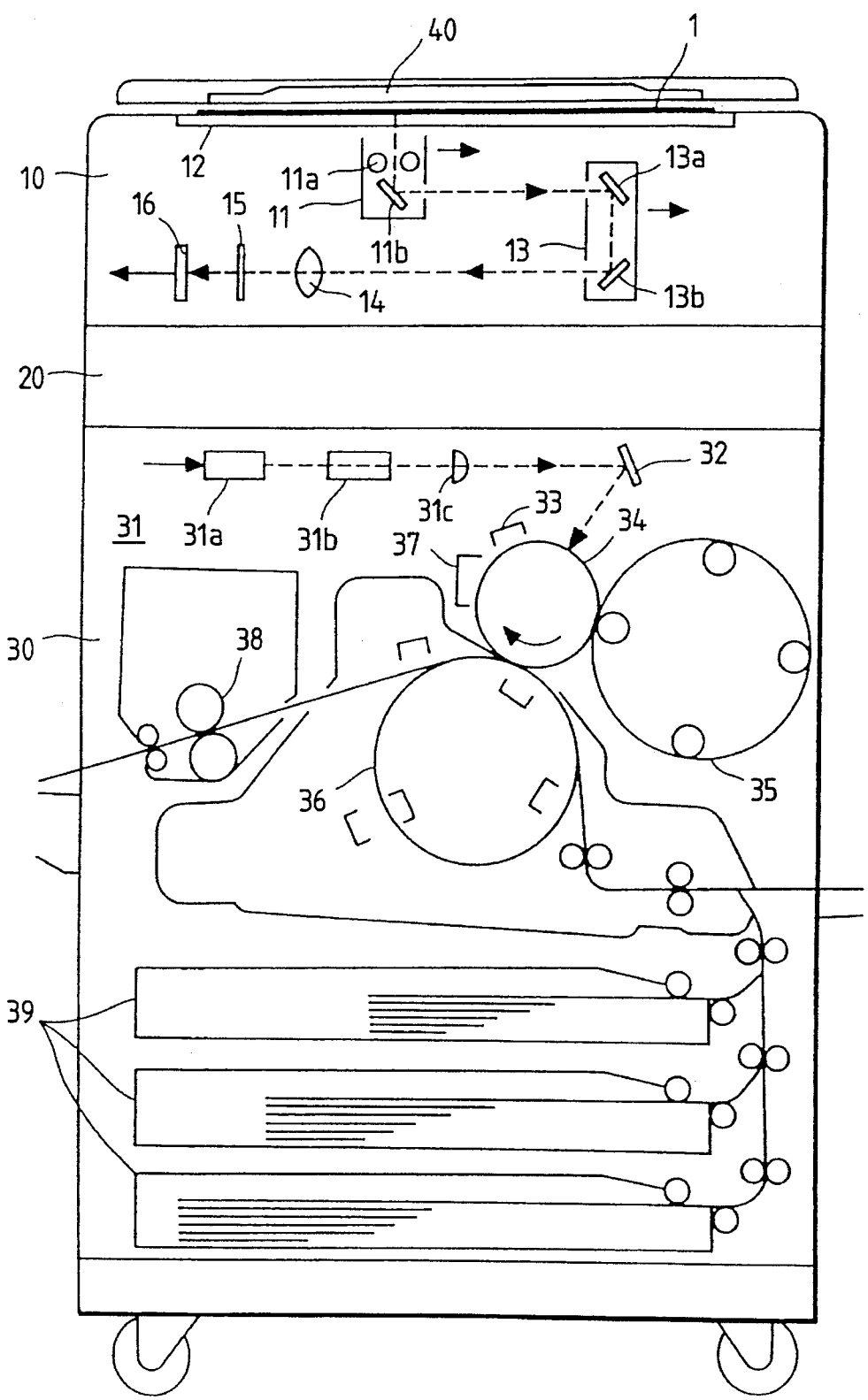
FIG. 11 is a chart illustrating an example of the mechanical construction of a color copying machine according to the present invention.

FIG. 1 shows an example of the functional configuration of a color copying machine according to the present invention, and FIG. 11 shows an example of the mechanical configuration of the color copying machine according to the present invention.

As shown in FIG. 1, the color copying machine in this example includes an image reading unit (an image input unit) 10, an image processing unit 20, an image output unit (an image forming unit) 30, a user interface 40, and a system control unit 50.

The image reading unit 10 reads an original sheet and converts the images read therefrom into input image data. In specific terms, the image forming device works in such a manner, as shown in FIG. 11, that the light emitted from a light source 11a, which is comprised of a halogen lamp, for example, and mounted on a full-speed carriage 11 sheds a beam of light onto an original sheet 1 placed on a platen glass 12, and the light reflected from the original sheet 1 is transmitted via a reflecting mirror 11b, which is mounted on a full-speed carriage, and reflecting mirrors 13a and 13b, which are mounted on a half-speed carriage, and via a lens 14 and divided into the colored lights in red, green, and blue, respectively, by a color filter 15, and the individual colored lights enter the line sensors (image sensors) 16 comprised of CCDs (solid-state image pickup elements), for example, and provided for the respective colored lights, and the images on the original sheet 1 are read, for example, at a resolution of 400 dpi (400 dots per inch).

Further, as shown in FIG. 1, the input image signals represented in red, green, and blue as fed from the line sensors 16 are amplified by an analog amplifier 17 and are thereafter subjected to an analog-digital (A/D) conversion by an analog-digital (AD) converter 18, and input image data R, G, and B in red, green, and blue, which are respectively in multiple chromatic gradation, are obtained from the AD converter 18.

The image processing unit 20 includes an image signal processing circuit 21, a pursuit image signal adding circuit 22, and a control circuit 23, and the image signal processing circuit 21 processes the input image data R, G, and B as fed from the image reading unit 10 and thereby converts the input image data into image information for transferring the image information contained in the input images to a sheet of paper. Specifically, the image signal processing circuit 21 receives the input image data R, G, and B fed from the image reading unit 10 and performs such various correcting processes as a shading correction and a gap correction and such various conversions as an enhancement of the reproducibility of output images, and such editorial processes as reductions and enlargements of images, and thereby produces image data in black, yellow, magenta, and cyan, which are primary colors of the toner.

For the pursuit image signal adding circuit 22, a specific example will be described later, and yet this pursuit image signal adding circuit 22 forms dot pattern data, owing to the operation of the CPU 26 in the control circuit 23, from the information for identifying the copying machine and adds the dot pattern data to the yellow image data, for example, out of the above-mentioned black, yellow, magenta, and cyan image data. In the image signal processing circuit 21, the image data to which the dot pattern data have thus been added are subjected to a digital-analog (D/A) conversion and are thereby transformed into chromatic gradation toner signals for the process colors, and the process color chromatic gradation toner signals are turned into binary values and are thereby formed into ON/OFF toner signals in binary values, and the ON/OFF toner signals in binary values are put out to the image output unit 30.

Further, the image processing unit 20 includes a board (printed circuit board) 24, and, on this board 24, an information input unit 25 as described below is provided for furnishing the copying machine with an input of information for specifying the copying machine.

The image output unit 30 forms an output image on a sheet of printing paper, operating in accordance with the ON/OFF toner signals in binary values as fed from the image processing unit 20. In specific terms, a semiconductor laser 31a which comprises a laser beam scanner 31 is driven with ON/OFF binary value toner signals supplied from the image processing unit 20, and the ON/OFF binary value toner signals are converted into optical signals, and the laser beam forms an electrostatic latent image on a photoreceptor drum 34 by scanning over the photoreceptor drum 34 charged by an electric charger 33 as the optical signals are transmitted via a polygon mirror 31b, an F/θ lens 31c, and a reflecting mirror 32.

Further, such a latent image is turned into a toner image by a developer 35 which is furnished with the toners in black, yellow, magenta, and cyan, and such an image formed in toner is transferred onto a sheet of printing paper transported from the paper feeding tray 39 and sucked up to an image transfer drum 36. After the toner image is thus transferred, an excessive deposit of the toner will be removed by a cleaner 37 from the photoreceptor drum 34. This process will be repeated in the stated order of black, yellow, magenta, and cyan, and the repetition of this process attains multiple transfers of the toner images onto a sheet of printing paper. Thereafter, the printing paper is separated from the image transfer drum 36, and the toner is fused by a fusing device 38, and the printing paper with the images thus copied thereon is discharged out of the copying machine.

The user interface 40 includes an operating unit which has a copy start button and the like and a display unit which has a light emitting diodes and the like, and, with this user interface 40, the user selects a desired function, instructs its execution and further puts the status of the operation of the copying machine on display on the display unit.

The system control unit 50 controls the entire copying machine and includes a CPU 51, a ROM 52 which stores a control program or the like written to it to be executed by the CPU 51, a RAM 53 used for a work area by the CPU 51, and an information storing unit 54, which, as described later, stores the information fed from the information input unit 25 provided in the image processing unit 20, and these components are installed on a system board 55.

For the information input unit 25, this image forming device uses a memory card and a switch group comprised of a plurality of dip switches or the like. In case the information input unit 25 is formed of a memory card, the image forming device has the memory card set on and connected to the board 24 at a time prior to the start-up of the power source for the first time in the copying machine after the specified copying machine is assembled, the memory card being kept in the state in which information such as an identification number unique to the copying machine or its manufacturing serial number which identifies the copying machine is written to the memory card. In case the information input unit 25 is a group of switches, it is installed on the board 24 in the process of the manufacture of the copying machine, and information identifying the copying machine, such as the information described above, is put into the image forming device as the positions or states of the individual switches are set up by the manufacturer of the copying machine before the power source is turned on in the copying machine after the assembly of the copying machine.

For the information storing unit 54, the image forming device uses a ROM, which performs the writing of data by its electrical operation, or a RAM, which, having a backup support with a battery, is capable of maintaining the information written to it even when the power source is turned off.

In the copying machine described in this example, the information supplied from the information input unit 25 as mentioned below will be written to the area 54a in the information storing unit 54 of the system control unit 50 in accordance with the control program which is written in the ROM 52 of the system control unit 50 at the time when the manufacturer feeds electric power to the copying machine for the first time.

At the time when electric power is fed to the copying machine for a second and any subsequent time, the information supplied from the information input unit 25 is not written to the area 54a, but the CPU 51 of the system control unit 50 compares the information fed from the information input unit 25 with the information stored in the area 54a, and the system permits a copying operation in a state in which the information stored in the area 54a is added to the output image in the form of a dot pattern, which will be described below, only at a time when the CPU 51 has found that the two pieces of information are in their agreement.

Figure 2:
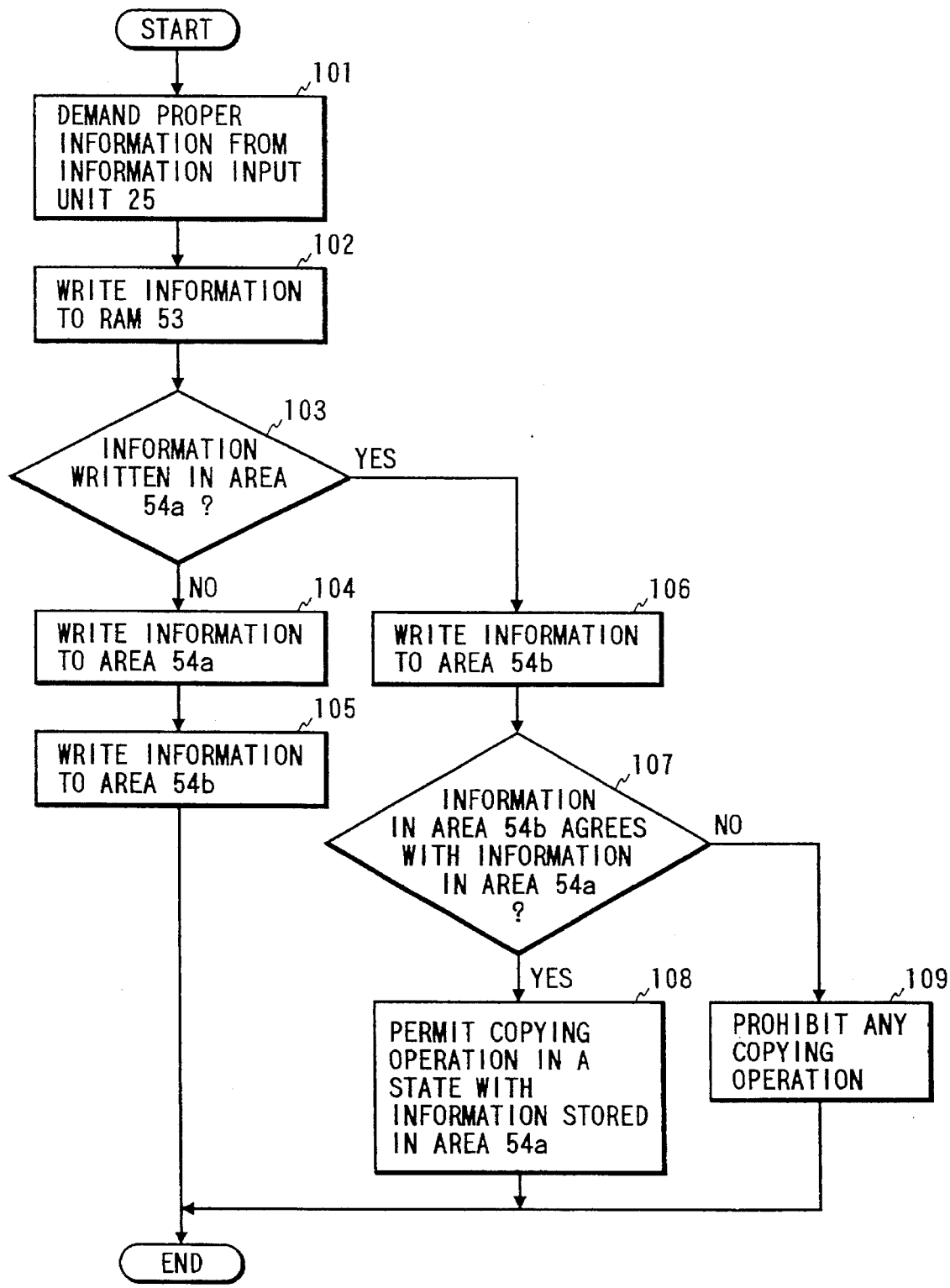
FIG. 2 is a flow chart illustrating an example of a control program to be executed by the CPU in the system control unit.

That is to say, as it can be seen in an example of the control program to be executed by the CPU 51 illustrated in FIG. 2, the CPU 51 operates first in step 101 to demand the CPU 26 of the image processing unit 20 to transmit the information from the information input unit 25, and, in response to this demand, the CPU 26 transmit the information from the information input unit 25 to the CPU 51. Next, in step 102, the CPU once writes the information from the information input unit 25 to the RAM 53.

Next, in step 103, the CPU 51 judges whether or not any information for identifying the copying machine is written to the area 54a of the information storing unit 54. At a time before the manufacturer of the copying machine turns on the power source for the copying machine for the first time, the information storing unit 54 is in a state in which it has no information whatsoever written to it. Therefore, in step 103, the system indirectly judges whether the application of electric power to the copying machine at that time is the first application of electric power to the copying machine after its manufacture.

In step 103, the CPU 51 may judge that no information has ever been written to the area 54a, i.e., the application of electric power to the copying machine is the first application of electric power to the specified copying machine, then the CPU 51 operates, in step 104, writes the information from the information input unit 25 as written to the RAM 53 in step 102 to the area 54a as information identifying the copying machine, and further in step 105, the CPU 51 writes the same information to another area 54b of the information storing unit 54.

If the CPU judges in step 103 that some information for identifying the copying machine has been written to the area 54a, i.e., that the application of electric power to the copying machine at the particular time is not the first application of electric power to the copying machine but a second or a subsequent application of electric power, then, in step 106, the CPU 51 writes to the area 54b the information from the information input unit 25 as already written to the RAM 53 in step 102.

Next, in step 107, the CPU 51 compares the information from the information input unit 25 as thus written to the area 54b with the information for identifying the copying machine as written to the area 54a in step 104 when the power source was turned on for the first time for the specified copying machine, and the CPU 51 judges whether or not the two pieces of information are in their mutual agreement.

The information supplied from the information input unit 25 and the information maintained in the area 54a will not be in any agreement in case the information possessed by the information input unit 25 is altered, or the information storing unit 54 is replaced with another such unit with other information written to its area 54a, or the electrical connection of the information input unit 25 or the information storing unit 54 is cut off, or the information input unit 25 or the information storing unit 54 has been removed, but the information from the information input unit 25 and the information stored in the area 54a will be in their mutual agreement if no alteration of the circuit, including any of those alterations of the information as described above is made.

In case the CPU 51 has judged in step 107 that the information supplied from the information input unit 25 and written to the area 54b in step 106 is in its agreement with the information stored in the area 54a, the CPU 51 finds that the information stored in the area 54a is proper information for identifying the copying machine, and, in step 108, the CPU 51 allows a copying operation in the state in which the information stored in the area 54a is added in the form of a dot pattern as described below to the output images. Yet, an actual copying operation is started by an operation of the copy start button provided on the user interface 40.

In case the CPU 51 has judged in step 107 that the information supplied from the information input unit 25 and written to the area 54b in step 106 is not in any agreement with the information stored in the area 54a, the CPU 51 finds that the information stored in the area 54a is not any proper information for identifying the copying machine, and, in step 109, the CPU 51 prohibits any copying operation by the copying machine.

A permission of a copying operation and a prohibition of a copying operation is put on display by the CPU 51 on the display unit of the user interface 40.

The information fed from the information input unit 25 is written to the area 54a when the power source is turned on for the copying machine for the first time, and, since the information is not re-written in the area 54a at the time of the second or any subsequent application of electric power to the copying machine, and, in case any alteration of the circuits, including alterations of information of the information, is limited to the side of the information input unit and does not extend to the side of the information storing unit 54, the information stored in the area 54a will be kept in the state of the proper information for identifying the copying machine even if the information fed from the information input unit 25 does not agree with the information stored in the area 54a. However, the example given above prohibits any copying operation even in such a case as this in order to ensure that the image forming device can prevent any falsification of a particular original sheet.

Figure 3:
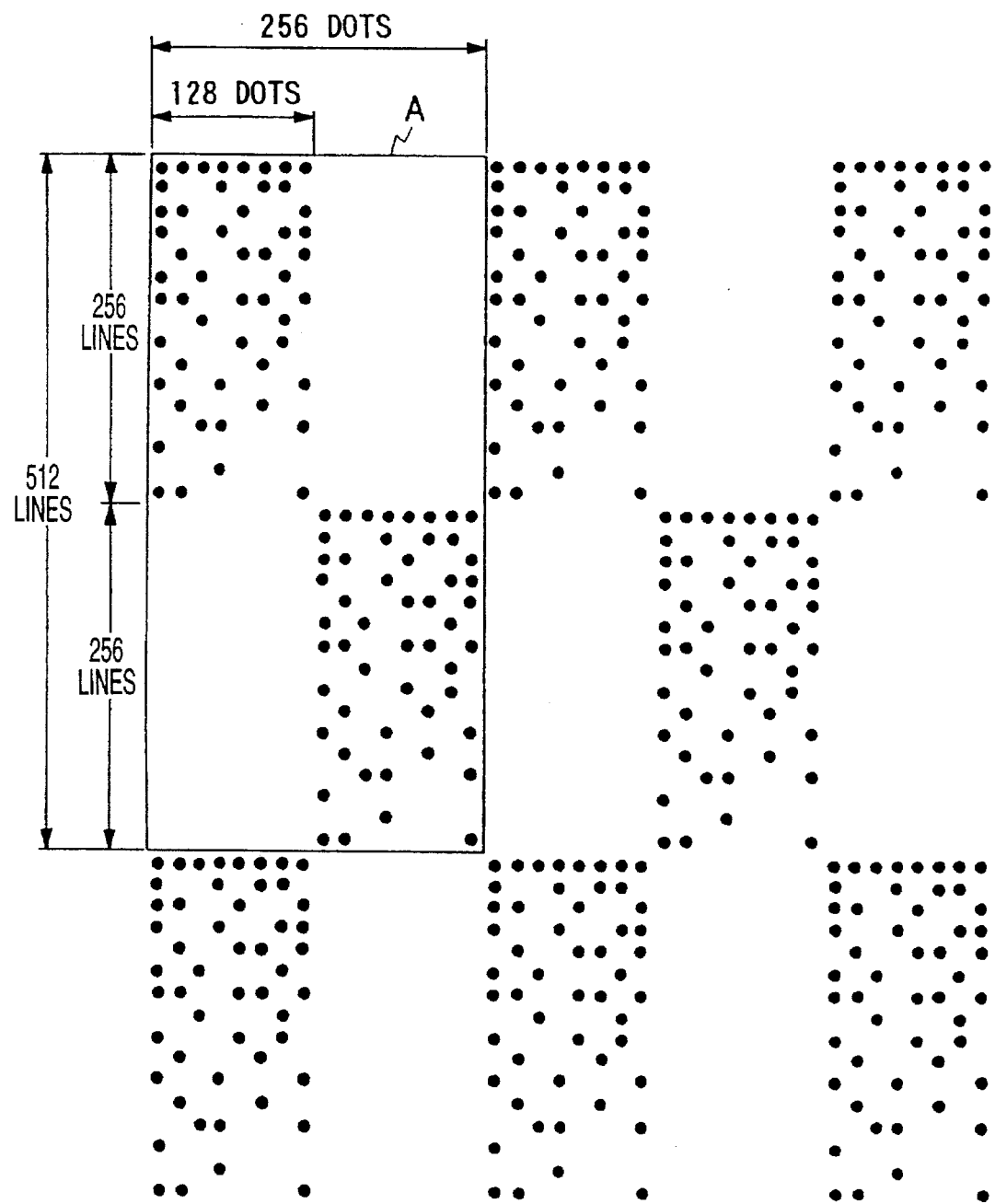
FIG. 3 is a chart illustrating an example of a dot pattern to be used as a pursuit image.

FIG. 3 illustrates an example of a dot pattern to be added to the output images as information for identifying the copying machine. In this example, a unit dot pattern corresponding to a bit pattern of the information for identifying the copying machine is developed in an area A composed of 256 dots in the fast scanning direction, which is the line direction of a line sensor 16, and 512 lines (i.e., 512 dots) in the slow scanning direction, which is the direction in which the line sensor 16 moves, and the unit dot pattern will be added repeatedly in the fast scanning direction and in the slow scanning direction over the entire surface of the copied object.

Figure 4:
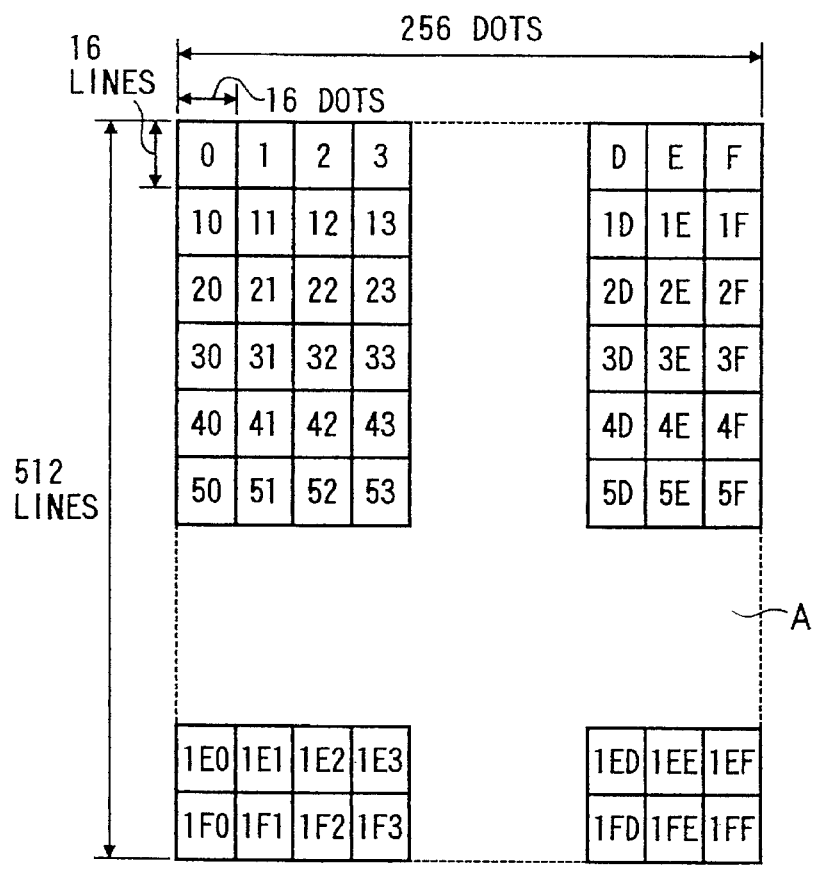
FIG. 4 is a chart illustrating an example of the division of the areas in which the dot pattern is to be generated.

The area A in which the unit dot pattern is formed is demarcated for every 16 dots in the fast scanning direction and in the slow scanning direction as illustrated in FIG. 4, so that the area A is thus divided into 16×32 smaller areas B=512 smaller areas B, and, in each of the smaller areas B, one bit corresponding to the bit pattern for the information for identifying the copying machine is allocated to each of the smaller areas B.

Figure 5:
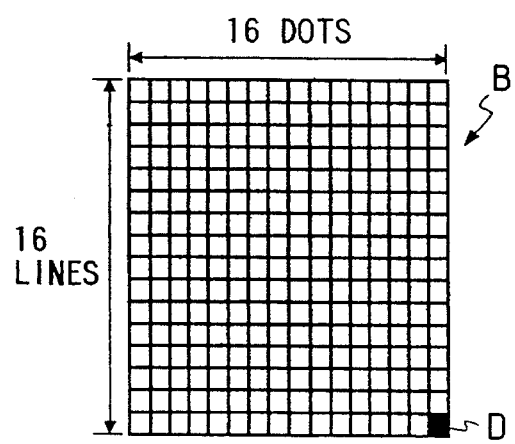
FIG. 5 is a chart illustrating an example of the specific dot position, which is to be taken as an object for the addition of dots in the divided smaller areas.

As shown in FIG. 5, for example, the position D at the 16th bit in the fast scanning direction and the 16th line in the slow scanning direction in the smaller area B is assigned as forming the position of a specified dot taken as the object for the addition of dots, and the system decides whether or not any dot is to be added to this specified dot position D in correspondence with "1" and "0" in the 1 bit corresponding to the smaller area B in the bit pattern of the information for identifying the copying machine. In other words, the "1" and the "0" in a corresponding single bit in the bit pattern for the information for identifying the copying machine will be expressed in accordance with the "Addition of Dots" and "No Addition of Dots" at the specified dot position D for each smaller area B.

In this example, however, the area A where the unit dot patterns are generated are divided into two parts in the fast scanning direction and in the subsidiary direction, respectively, i.e., into a total of four divided areas, as it is shown clearly in FIG. 3, and, of these four divided areas, the dot patterns are generated only the divided area in the upper left portion and the divided area in the lower right part, so that the dot patterns are formed in a checkered pattern for the entire area of the copied object. It is possible also to form different dot patterns in the divided area in the left upper portion and in the divided area in the lower right portion, respectively, but the example illustrated in FIG. 3 is a case in which the same dot patterns are formed in these divided areas.

Figure 6:
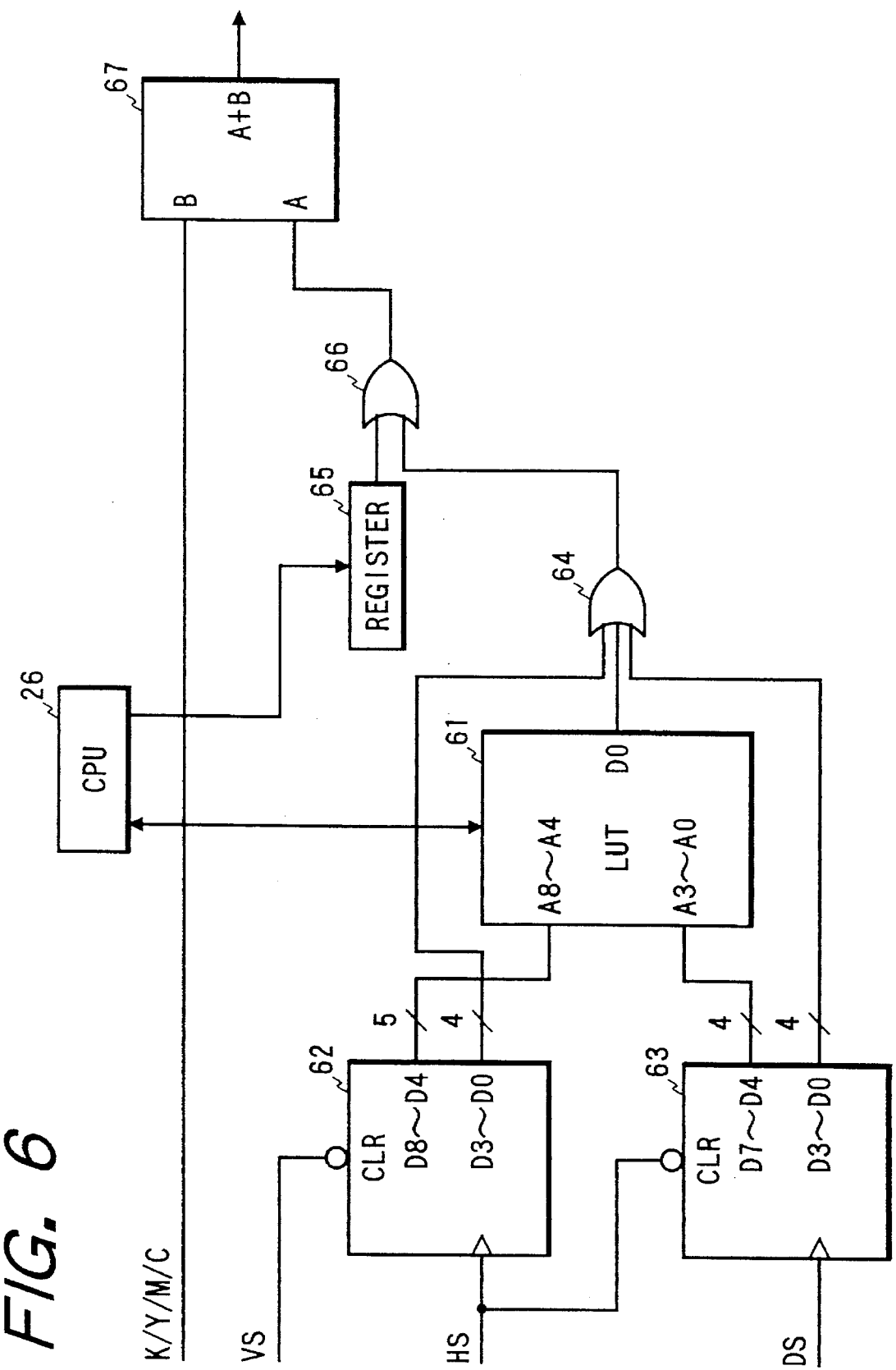
FIG. 6 is a block diagram illustrating an example of a pursuit image signal adding circuit.

FIG. 6 illustrates an example of the pursuit image signal adding circuit 22, which is initially shown in FIG. 1, and the pursuit image signal adding circuit 22 generates bit data in the dot patterns as shown in FIG. 3 and adds the dot pattern data to the image data for yellow, which are obtained in the image signal processing circuit 21.

The pursuit image signal adding circuit 22 in this example includes, for instance, a look-up table 61 (hereinafter referred to as LUT), which is comprised of a RAM, a counter 62 for the slow scanning direction, a counter 63 for the fast scanning direction, an AND gate 64, a register 65, an AND gate 66, and an adder 67.

The LUT 61 can change its contents freely in response to an access made by the CPU 26 of the image processing unit 20. And, as mentioned above, the information kept in memory in its area 54a is transmitted as the information for identifying the copying machine from the CPU 51 of the system control unit 50 to the CPU 26 of the image processing unit 20, when the CPU 51 of the system control unit 50 finds that the information fed from the information input unit 25 are in its agreement with the information stored in the area 54a of the information storing unit 54 at the time when the electric power source is turned on for a second and any subsequent times for the copying machine, and the information thus transmitted to the CPU 26 in the image processing unit 20 is converted by the CPU 26 into bit data for the unit dot patterns to be developed in the area A mentioned above, the bit data thus generated by the conversion being stored in the LUT 61.

In this case, the information identifying the copying machine, for example, is formed into data in eight bits for one word, so that the data in eight bits for one word thus formed will correspond to the eight bits in the fast scanning direction in the above-mentioned divided area at the upper left portion and the above-mentioned divided area at the lower right portion, respectively, in the area A. And, bit pattern data in correspondence to the information words are stored in the memory areas which are provided in the LUT 61 and respectively correspond to the upper left divided area and the lower right divided area in the area A, and the bit data "0", which means "No Addition of Dots", are stored, as the bit data for all the divided areas, in the memory areas respectively corresponding to the upper right divided area and the lower left divided area.

The counter 62, which is a 9-bit counter, receives a page synchronizing signal (a clock signal for the period of one page) VS as its reset input and a line synchronizing signal (a clock signal for the period of one line in the slow scanning direction) HS as its count clock input, and the counter 62 sequentially counts the lines from the first line to the 512th line in the slow scanning direction in the area A.

The counter 63, which is an 8-bit counter, receives a line synchronizing signal HS as its reset input and a dot synchronizing signal (a clock signal for the period of one dot in the fast scanning direction) DS as its count clock input, and the counter 62 sequentially counts the dots from the first dot to the 256th dot in the fast scanning direction in the area A.

Into the addresses from A8 to A4 in the LUT 61, the more significant five bits from D8 to D4, out of the 9-bit count outputs from the counter 62 are fed. Accordingly, the addresses from A8 to A4 in the LUT 61 change for every 16 lines in the slow scanning direction, and the dot addresses (i.e., bit addresses) in the slow scanning direction for the dot patterns stored in the LUT 61 are thereby specified.

In the same manner, the more significant four bits from D7 to D4, out of the count outputs in eight bits from the counter 63 are fed into the addresses A3 to A0 in the LUT 61. Accordingly, the addresses A3 to A0 in the LUT 61 change for every 16 bits in the fast scanning direction, and the dot addresses (bit addresses) in the fast scanning direction for the unit dot patterns stored in the LUT 61 are thereby specified.

The respective less significant four bits D3 to D0 in the counter 62 and the counter 63 are supplied to the AND gate 64. The logical product of the less significant four bits D3 to D0 in the counter 62 attains a high level in the period for one line in every 16 lines in the slow scanning direction in the area A, and the logical product of the less significant four bits D3 to D0 in the counter 63 attains a high level in the period of one dot for every 16 dots in the fast scanning direction in the area A. Therefore, the AND gate 64 is enabled to attain a high level, which forms the state of "gate open" only in the position for every 16 dots in the fast scanning direction and at the same time in the position for every 16 lines in the slow scanning direction, i.e., in the position D of the specific dot shown in FIG. 5, which shows the individual smaller areas B illustrated in FIG. 4.

Then, the bit data for the unit dot pattern read out as an output from the one dot D0 in the LUT 61, with the address being specified in the manner described above, is supplied to the AND gate 64. Therefore, the bit data in the unit dot pattern can be obtained in the specific dot position D from the AND gate 64.

The output bit data from this AND gate 64 is supplied to the AND gate 66, together with the data from the register 65, and, for every single bit of the output data from the register 65, the logical product of the output data and the output bit data from the AND gate 64 can be obtained from the AND gate 66.

The data in the register 65 is set by the CPU 26, and the image data Y for yellow, for example, can be obtained in the image processing unit 20, and, when an yellow image is formed in the image output unit 30, the image data Y is processed into data with the highest density, which is expressed by "FF" in the hexadecimal number system, and the image data K, M, and C which are for black, magenta, and cyan, respectively, are obtained in the image processing unit 20. Then, when the images in black, magenta, and cyan are formed in the image output unit 30, the image data are set at the lowest density, which is expressed by "00" in the hexadecimal number system.

Accordingly, from the AND gate 66, the data at the highest degree of density from the register 65 is put out as it is only when the output bit data from the LUT 61 is set at "1" as an yellow image is formed in the image output unit 30, with yellow image data Y being obtained in the image processing unit 20. That is to say, only those output bit data which attain "1", among the output bit data from the LUT 61, are put out in the state of having been converted into the data at the highest degree of density from the AND gate 66 only when an image in yellow is formed in the image output unit 30 with the image data Y for yellow being obtained in the image processing unit 20.

The output data from the AND gate 66 is supplied to the adder 67, from which the data is added to the image data Y for yellow when the image data Y for yellow is obtained in the image processing unit 20. Therefore, when the image in yellow is generated in the image output unit 30, the unit dot pattern is added to the output image in yellow, which it is difficult for the human eyes to recognize, as the information for specifying the copying machine, and the unit dot pattern is developed repeatedly in the fast scanning direction and in the slow scanning direction over the entire area of the copied object, as mentioned above.

Figure 7:
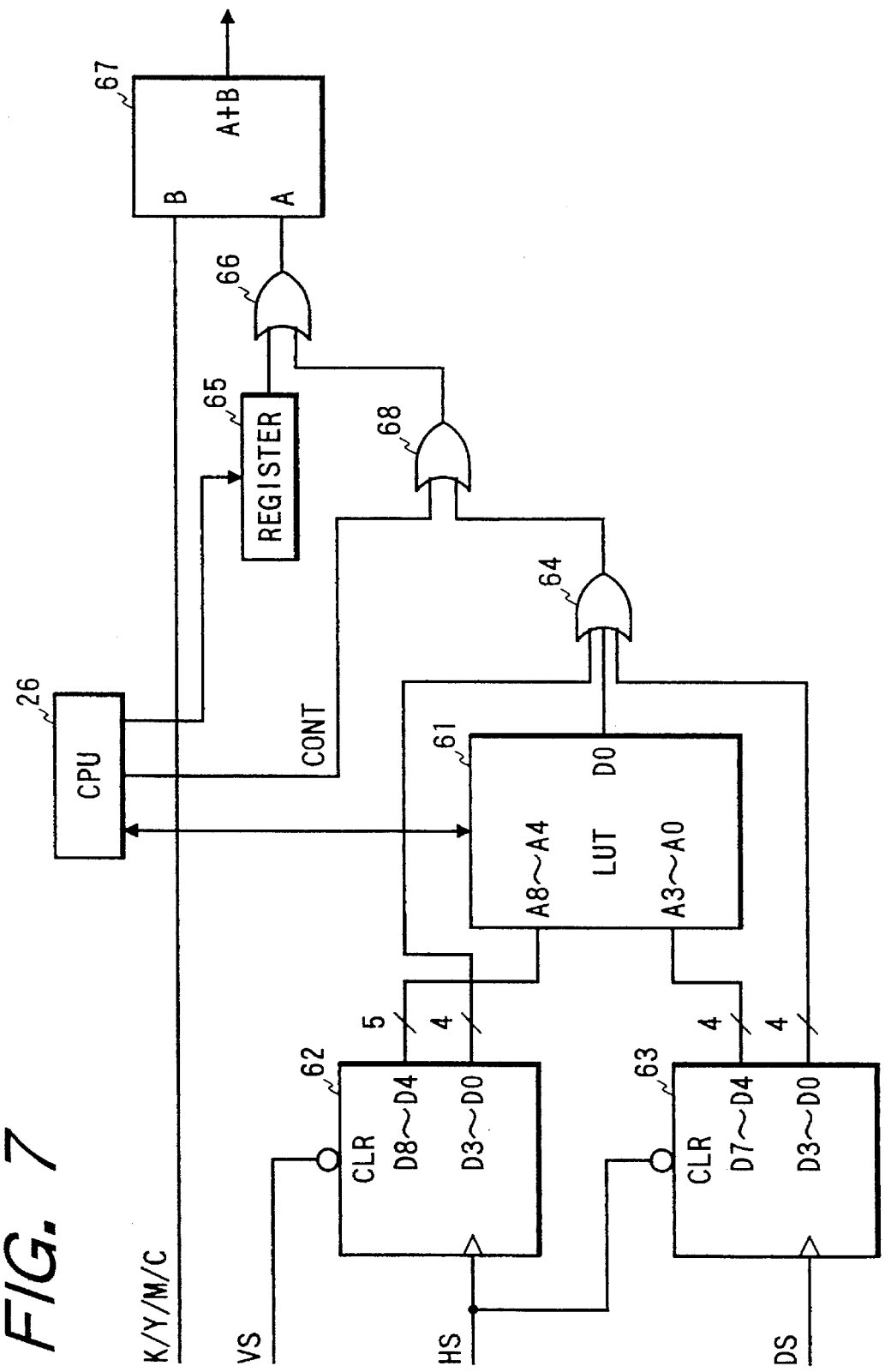
FIG. 7 is a block diagram illustrating another example of the pursuit image signal adding circuit.

FIG. 7 shows another example of the pursuit image signal adding circuit 22, and, in this embodiment, a CPU 26 sets the data at the highest density in a register 65 at all the time, and the output bit data from an AND gate 64 and a control signal CONT from the CPU 26 are supplied to an AND gate 68. Then, the output data from the AND gate 68 and the data fed out at the highest density from the register 65 are supplied to an AND gate 66, and the output data from the AND gate 66 are supplied to an adder 67.

The control signal CONT will be set at "1" when image data Y for yellow is obtained in the image processing unit 20 and an image in yellow is generated in the image output unit 30, whereas the control signal CONT will be set at "0" when image data K, M, or C is obtained in the image processing unit 20 and an image in black, magenta, or cyan is generated in the image output unit 30.

Accordingly, only when the image data Y is obtained in the image processing unit 20 and an image in yellow is generated in the image output unit 30, the AND gate 68 puts out the output bit data from the LUT 61 and the AND gate 66 puts out only the output data to be set at "1", out of the output bit data from the LUT 61, the output data thus specified being put out in the state as converted into the data at the highest degree of density. Then, a dot pattern in yellow, which it is difficult for the human eyes to recognize, will be added to the output image in exactly the same manner as in the case of the example shown in FIG. 6.

According to the example described above, it is feasible first to put some information for identifying the copying machine into the copying machine by using the information input unit 25 after the assembly of the copying machine. Thus, this process does not require any control of information for identifying the copying machine in the process of the manufacture of the copying machine.

Secondly, when it is recognized that some alteration, including a falsification of information has been made of any circuit, it is possible for this control system described in this example surely to prevent a copying operation from being performed in any state in which the operated copying machine cannot be specifically recognized or in any state in which a copying machine may be recognized by an error, as mentioned above, by prohibiting a copying operation itself, for example, regardless of the point whether such an alteration of the information still remains at the side of the information input unit 25 and has not yet extended to the side of the information storing unit 54.

The system board 55, on which the system control unit 50 is installed, is to be set in an internal location not easily accessible by any user of the copying machine also from the viewpoint of preventing any alteration of any circuit at the side of the information storing unit 54, including any falsification of the information, by any person who attempts at falsifying any specified original document.

However, with mechanical alteration preventing mechanisms provided in addition, it is possible to ensure that no circuit at the side of the information storing unit 54 is ever liable to any alteration. Some examples of such alteration preventing mechanisms are shown in the following part.

Figure 8A:
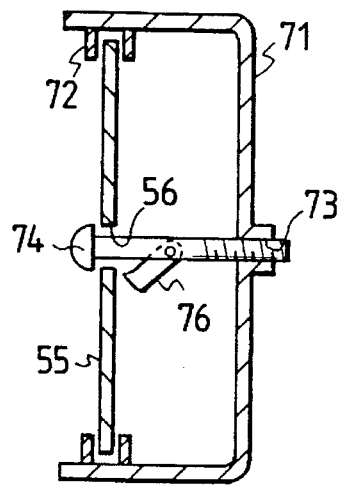
FIGS. 8(A) to 8(D) are charts illustrating an example of an alteration preventing mechanism.
Figure 8B:
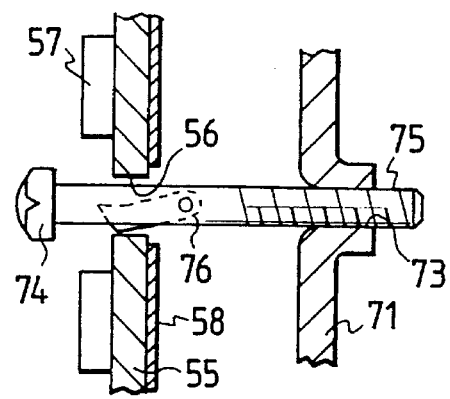

FIGS. 8(A) to 8(D) illustrate an example of such an alteration preventing mechanism, and, as shown in FIG. 8(A), a chassis 71 which holds the system board 55 has a rail 72 provided on its side plate portion, and also a screw hole 73 is made in the center of the bottom plate of the chassis 71 while the system board 55 has a hole 56 made in its central area. The system board 55 is then inserted into the rail 72 in the direction perpendicular to the paper surface, and, with the system board 55 kept in the state just mentioned, a screw 74 is inserted from the top end portion 75 into the hole 56 made in the system board 55, as shown in FIG. 8(B), and the top end portion 75 is inserted into the screw hole 73 in the chassis 71.

Figure 8C:
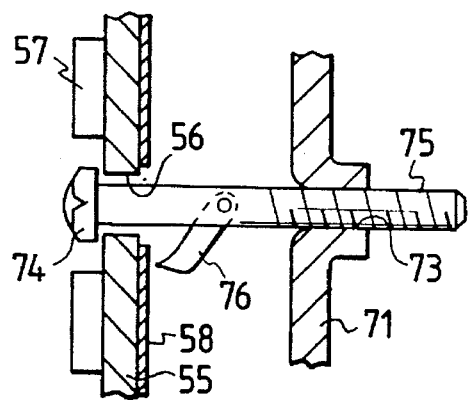
Figure 8D:
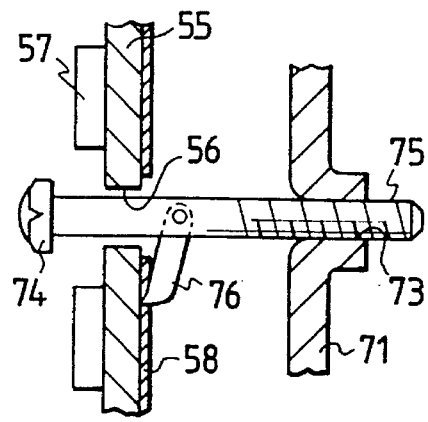

The screw 74 contains a hook 76 in its central portion, and, when the screw 74 is inserted to a prescribed position in the chassis 71, the hook 76 is spread as illustrated in FIG. 8(C). Now, when it is attempted to pull out the system board 55 in the direction perpendicular to the paper surface, with the screw 74 being removed from the chassis 71 in an effort to alter the circuit 57 on the system board 55, a circuit pattern (printed pattern) 58 on the system board 55 will be broken by the hook 76 as shown in FIG. 8(D), and the system board 55 is thereby put into a disabled state prohibiting its use, so that the copying machine can no longer perform a copying operation itself.

Figure 9A:
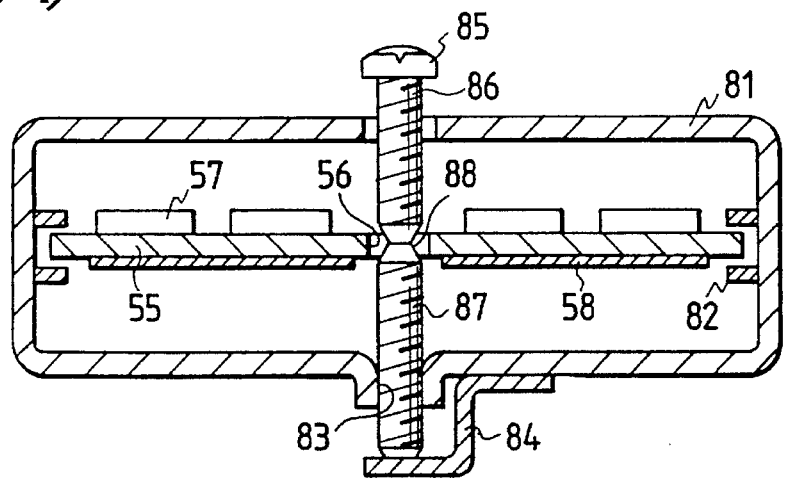
FIGS. 9(A) to 9(C) are charts illustrating another example of the alteration preventing mechanism.
Figure 9B:
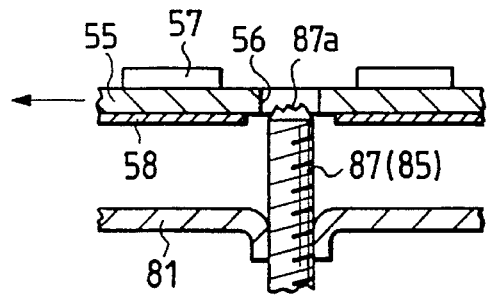
Figure 9C:
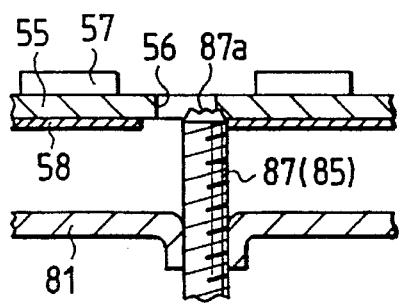

FIGS. 9(A) to 9(C) illustrate another example of the alteration preventing mechanism. As shown in FIG. 9(A), a chassis 81, which holds the system board 55, has a rail 82 provided in its side plate portion, with a screw hole 83 made in the central area of its bottom plate and with a stopper 84 provided at the outer side of the central area of its bottom plate, and the system board 55, which has a hole 56 made in its central area, is inserted into the rail 82 in the direction perpendicular to the surface of the paper, and, in that state, a screw 85 is inserted into the hole 56 in the system board 55 and inserted into the screw hole 83 in the chassis 81.

Yet, the screw 85 has a cut 88 between the side portion 86 of its head portion and the portion 87 at the side of its top end, and, when the screw 85 is inserted to the position in the chassis 81 where the part of the screw 85 at its top end side comes into its contact with the stopper 84, the screw 85 is tightened with a torque not less than a certain level of force, and the portion 86 at the side of the head of the screw 85 is broken off in the position of the cut 88, and the top end portion 87 of the screw 85 will be put into a state in which the portion 87 cannot be detached from the chassis 81 as shown in FIG. 9(B).

When it is attempted to pull out the system board 55 from the chassis 81 in the direction marked by the arrow in FIG. 9(B), which is the direction perpendicular to the surface of the paper of FIG. 9(A) in an effort to alter the circuit 57 on the system board 55 in the state mentioned above, the circuit pattern 58 on the system board 55 will be cut off by the cut face 87a in the top end portion 87 of the screw 85, as shown in FIG. 9(C), and the system board 55 will be thereby disabled and rendered unusable, so that the copying machine will no longer be capable of performing a copying operation itself.

Figure 10A:
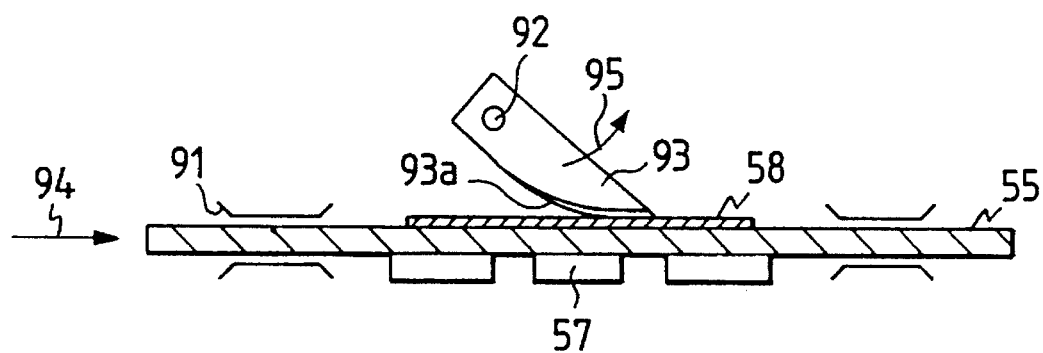
FIGS. 10(A) and 10(B) are charts illustrating still another example of the alteration preventing mechanism.
Figure 10B:
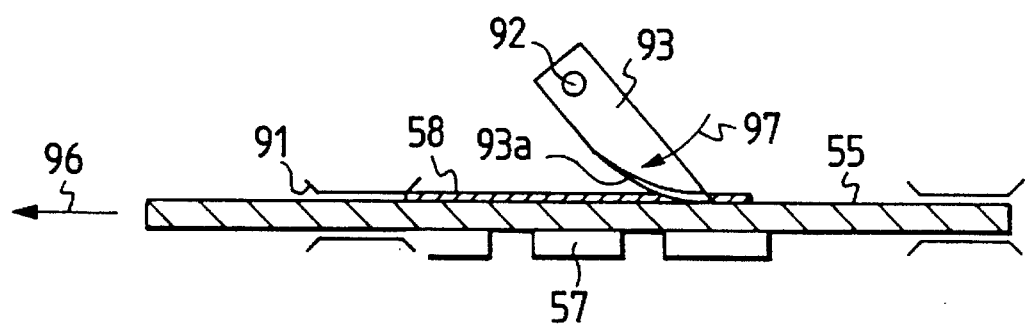

FIGS. 10(A) and 10(B) illustrate still another example of the alteration preventing mechanism. As shown in FIG. 10(A), the system board 55 is inserted into a rail 91, but a blade 93 is installed on a pivotal shaft 92, in such a manner as to be capable of rotating, in a position above the system board 55.

Then, when the system board 55 is inserted into the rail 91 in the manner shown by an arrow mark 94, the blade 93 moves so as to avoid the system board 55, as shown by an arrow mark 95, so that the blade edge 93a will not damage the circuit pattern 58 formed on the system board 55, but, when it is attempted to pull out the system board 55 from the rail 91, as shown by an arrow mark 96, the blade 93 will then rotate in the direction in which its edge cuts into the system board 55, as shown by an arrow mark 97 in FIG. 10(B), and the circuit pattern 58 formed on the system board 55 is cut off by the blade edge 93a, so that the system board 55 is thereby disabled to be no longer available for use and the copying machine will be no longer capable of performing any copying operation itself.

With an alteration preventing mechanism like the one shown in the example illustrated in FIGS. 8(A) to 10(B) being provided for the system board 55, it is possible to ensure that no alteration can ever be made of any circuit at the side of the information storing unit 54.

In a configuration comprised of the system board 55 which is installed in a location in the copying machine not accessible, except with considerable difficulty, for the user of the copying machine and, in addition to this feature, provided with an alteration preventing mechanism, such as any of those described in the foregoing examples shown in FIGS. 8(A) to 10(B), installed on the system board 55, the system being so constructed that the information fed from the information input unit 25 is written to the area 54a of the information storing unit 54 only when an electric power source is turned on for the first time for the copying machine, as mentioned above, and that the information thus written cannot be rewritten on the area 54a at a second or any subsequent time when an electric power source is turned on for the copying machine, it will not be necessary to add to the output image the information stored in the area 54a as a pursuit dot pattern only when the information fed from the information input unit 25 and the information stored in the area 54a are found by the CPU 51 to be in their agreement, as mentioned above, when the CPU 51 compares both of these pieces of information, because the information stored in the area 54a is always kept in the state of proper information for identifying the copying machine, even if the information supplied from the information input unit 25 does not agree with the information stored in the area 54a, so that it will be possible to operate the system in such a manner, for example, that the information fed from the information input unit 25 will be written to the area 54a at every time when the power source is turned on for the copying machine and also that the information written to the area 54a can be added as it is as a pursuit dot pattern to the output image.

With the configuration of the system described in the foregoing examples, it will be sufficiently effective only if the information input unit 25 puts into the copying machine the information for identifying the copying machine after the copying machine has been assembled, and it will not be necessary to control any information for specifying any copying machine in the process of the manufacture of the copying machine. Further, this system offers a complete prevention of the circuits at the side of the information storing unit 54 from being altered in any way, and it is thereby made possible to ensure that no copying operation can be performed in any state in which the copying machine used cannot be specifically identified or in any state in which the copying machine is liable to be identified by an error.

Also the board 24 on which the information input unit 25 of the image processing unit 20 is mounted can be installed in a location in the inside of the copying machine to which the user cannot reach except with considerable difficulty, so as to prevent any alteration of the circuit, including any alteration of the information, at the side of the information input unit 25 by any person who makes any attempt at altering any specified original form. In addition to this, it is possible also to provide an alteration preventing mechanism as any of those shown in the examples illustrated in FIGS. 8(A) to 10(B).

Thus, also the board 24 can be installed in a location in the copying machine not permitting any ready access by the user and, in addition to this, the copying machine in such a construction can be provided with an alteration preventing mechanism like any of those described in the examples shown in FIGS. 8(A) to 10(B). In the case of the copying machine in such a construction, the information supplied from the information input unit 25 and the information which is stored in the area 54a, as the result of the writing of the information from the information input unit 25 to the area 54a, will be in their agreement and will be maintained in a state of proper information for identifying the copying machine, and it is therefore not necessary to configure the control system so as to write the information from the information input unit 25 to the area 54a only when the power source is turned on for the copying machine for the first time as mentioned above. Further, it is not necessary, either, to put the CPU 51 into operation for comparing the information supplied from the information input unit 25 with the information stored in the area 54a, and it is possible to form a system structure in which the information from the information input unit 25 is written to the area 54a at each time when the power source is turned on for the copying machine and also the information written to the area 54a is added as it is to the output image for its use as a pursuit dot pattern.

According to these examples describing a control system formed in this manner, it will be sufficient only to set the information input unit 25 into operation for putting into the copying machine the information for identifying the copying machine after the copying machine has been assembled, and it will not be necessary to control any information for specifying the copying machine in the process of the manufacture of the copying machine. Further, this system offers a complete prevention of the circuits at the side of the information storing unit 54, as well as the circuits at the side of the information input unit 25, from being altered in any way, and it is thereby made possible to ensure that no copying operation can be performed in any state in which the copying machine used cannot be specifically identified or in any state in which the copying machine is liable to be identified by an error.

In the case of the example in which the CPU 51 compares the information supplied from the information input unit 25 with the information stored in the area 54a and the information stored in the area 54a is added to the output image, the added information being used as a pursuit image which it is hard to recognize or it is impossible to recognize with the human eyes, the control system may be designed in such a manner that the system adds the information stored in the area 54a, or the information supplied from the information input unit 25, or both of these types of information as an image in such a color as red, which is clearly and distinctly recognized with the human eyes, so that the manufacturer or the user of the copying machine may be thereby informed of the fact that the copying machine is in a state in which its system cannot recognize the identity of the copying machine or is liable to make a false recognition of the copying machine, instead of prohibiting the user to operate the copying machine as described above, in the event that the above-mentioned two types of information are found to be in their disagreement.

In the case of the example in which the information fed from the information input unit 25 is written only once to the area 54a, it is possible also to perform such an operation as to execute the one-time writing of the information when the manufacturer of the copying machine performs a special operation or processing for writing the information, instead of executing the one-time writing operation of the information when the manufacturer of the copying machine turns on the power source for the copying machine for the first time after its assembly, as described above.

Although it is hard or impossible to recognize a pursuit image with the human eyes, the pursuit image need not necessarily be in the pattern and in the color as described above, so long as such an image can be read by such a means as a CCD scanner and so long as the information thereof can be deciphered. Also, the specific configuration of the pursuit image signal adding circuit 22 is not to be limited to any of those configurations illustrated in FIGS. 6 or 7.

Also, the mechanical configuration of the color copying machine is not to be limited to its configuration illustrated in FIG. 11.

The present invention is not limited to a color copying machine, but may be applied effectively to any image forming device, such as a color printer.

As described above, the present invention offers an image forming device which does not require any control of the information for identifying the image forming device in the process of the manufacture of the image forming device since it is not necessary to write any information for identifying the specific image forming device in advance in the information storing unit in the process of the manufacture of the image forming device and also since it is sufficient to put some relevant information for recognizing the image forming device into the image forming device by the information input unit after the assembly of the image forming device.

What is claimed is:

1. As image forming device which processes an input signal to thereby obtain an output image signal, and forms an output image from the output image signal, said forming device comprising:

information generating means for generating information for identifying said image forming device;

information storing means for storing the information;

means for determining whether the stored information is the same as predetermined information;

memory control means, responsive to the determining means, for controlling the storage of information by said information storing means by preventing said information storing means from storing new information after said information storing means has once stored the information generated by said information generating means; and pursuit image signal adding means for adding to the output image signal the information stored in said information storing means as a pursuit image signal that is not viewable by eye when the output message signal is developed as an image, when the stored information is the same as the predetermined information.

2. The image forming device as defined in claim 1, wherein said image storing means effects the storage of the information generated by said information generating means when a power source supplies a power for the first time to said image forming device.

3. An image forming device which processes an input image signal to thereby obtain an output image signal, and forms an output image from the output image signal, said image forming device comprising:

information generating means for generating information for identifying said image forming device;

information storing means for storing the information;

memory control means for controlling the storage of information by said information storing means by preventing said information storing means from storing new information after said information storing means has once stored the information generated by said information generating means;

information comparing means for comparing the information generated by said information generating means with the information stored in said information storing means; and pursuit image signal adding means for adding to the output image signal the information stored in said information storing means as a pursuit image signal that is not viewable by the human eye when the output image signal is developed as an image when said information comparing means finds that the information generated by said information generating means is in agreement with the information stored in said information storing means.

4. The image forming device as defined in claim 3, wherein said image storing means effects the storage of the information generated by said information generating means when a power source supplies a power for the first time to said image forming device.

* * * * *

UNITED STATES PATENT AND TRADEMARK OFFICE
CERTIFICATE OF CORRECTION

PATENT NO. : 5,568,268
DATED : October 22, 1996
INVENTOR(S) : Masato TSUJI et al.

It is certified that error appears in the above-indentified patent and that said Letters Patent is hereby corrected as shown below:

```
Claim 1, Column 14, line 44, "As"
should read --An--.
```

Signed and Sealed this

Twenty-second Day of April, 1997

*Attest:*

BRUCE LEHMAN

*Commissioner of Patents and Trademarks*

*Attesting Officer*